United States Patent [19]

Weinstein

[11] Patent Number: 5,000,468
[45] Date of Patent: Mar. 19, 1991

[54] BOAT DOLLY

[76] Inventor: Burton Weinstein, 4 Windward La., City Island, N.Y. 10484

[21] Appl. No.: 312,764

[22] Filed: Feb. 17, 1989

[51] Int. Cl.⁵ .............................................. B62B 3/00
[52] U.S. Cl. ................................. 280/47.34; 114/344; 280/47.331
[58] Field of Search ............. 280/47.131, 47.34, 47.26, 280/47.331, 414.1, 414.2, 79.7, 79.3; 114/344

[56] References Cited

U.S. PATENT DOCUMENTS

| | | | |
|---|---|---|---|
| 2,174,870 | 10/1939 | Daniels | 280/79.3 |
| 2,551,040 | 5/1951 | Newell | 114/344 |
| 2,723,130 | 11/1955 | Andrews | 280/414.1 |
| 3,159,410 | 12/1964 | Raymond | 280/414.2 |
| 4,214,774 | 7/1980 | Kluge | 280/414.1 |
| 4,507,016 | 3/1985 | Honour, VII | 280/414.1 |
| 4,602,802 | 7/1986 | Morgan | 280/47.331 |
| 4,781,397 | 11/1988 | Burn | 280/47.331 |
| 4,815,761 | 3/1989 | Henderson et al. | 280/47.331 |

FOREIGN PATENT DOCUMENTS

| | | | |
|---|---|---|---|
| 1556049 | 1/1970 | Fed. Rep. of Germany | 280/79.3 |
| 2603502 | 8/1976 | Fed. Rep. of Germany | 280/414.1 |
| 2633149 | 1/1978 | Fed. Rep. of Germany | 280/47.331 |
| 2900283 | 7/1979 | Fed. Rep. of Germany | 280/47.331 |
| 1281398 | 7/1972 | United Kingdom | 280/47.34 |

Primary Examiner—Charles A. Marmor
Assistant Examiner—Eric Culbreth
Attorney, Agent, or Firm—Darby & Darby

[57] ABSTRACT

A dolly for transporting a boat in a laterally vertical orientation. The dolly has a pair of spaced frame members forming a pocket or cradle for holding the boat, and a stabilizing bar for engaging the topmost beam of the boat or to which an elastic member is attached for securing the topmost beam. The dolly has four wheels or two wheels and in the four wheel configuration the front wheels can be of the swivel type. The spacing between the two frame members can be adjusted to accommodate boats of different depths.

10 Claims, 2 Drawing Sheets

BOAT DOLLY

BACKGROUND OF THE INVENTION

The present invention relates to a dolly for transporting boats, particularly relatively small boats. Various types of dollies are used to move small boats or dinghies, with the boats or dinghies being either of the rigid configuration, or inflatable, or a combination of both. Such boats when combined with their floor boards and other attendant equipment can become quite heavy and unwieldy to the extent that one person cannot move or transport them on land without assistance.

Dollies for boats are known, for example, in U.S. Pat. No. 3,159,410 to Raymond, and U.S. Pat. No. 4,214,774 to Kluge. Such dollies usually act to transport the boat while it is in its horizontal position, i.e., the same position that the boat would assume while it is on the water.

The dollies of the prior art in general have not been adequate to sufficiently reduce the energy required to load the boat onto the dolly so that an individual could easily move the boat. In most cases, the prior art dollies still require the user to carry half the load, as in a wheelbarrow, when loading the boat onto or off of the dolly, since they require the boat to be raised onto or taken off of the dolly while in flat, horizontal position, either right side up or upside down.

Further, even when the boat is on the dolly, there is a disadvantage since, if the boat is in a horizontal position, it is difficult to roll the boat up or down an average gangway or ramp since the railings on such gangways or ramps are spaced fairly closely together. This close spacing will not permit the passage of the boat in a normal horizontal orientation since the beam dimension of the boat is usually greater than the distance between the railings. When this situation is encountered, the boat must be moved by lifting it physically above the railings for passage over the gangway.

BRIEF DESCRIPTION OF THE PRESENT INVENTION

The present invention relates to a boat dolly which is designed to accept, hold and transport the boat beam-wise vertically. That is, the boat is turned at 90° from its normal horizontal position. The dolly is preferably made of a light weight material, such as tubular aluminum or steel, and is formed with a pocket or cradle to accept and hold the boat beam-wise vertically.

The dolly has wheels and is configured so that it can be installed while the boat is in its normal horizontal orientation on the ground or dock, i.e., the dolly is really placed in position around the boat with the boat in the dolly's cradle. The dolly with the loaded boat is thereafter turned by 90° to raise the boat now in the dolly cradle with a vertical beam-wise position. The dolly also includes a stabilizing bar for holding the boat in this position.

With the boat in a laterally vertical position on the dolly, it can be easily moved, completely supported by the wheels of the dolly. Since the depth of the boat being moved is its smallest dimension, in most cases smaller than the width of most gangway railings, the dolly can be used to move the boat over places having this type of narrow access.

OBJECTS OF THE INVENTION

It is therefore an object of the present invention to provide a dolly that can readily accept, carry and transport a small boat in a laterally vertical (beam-wise) position.

Another object is to provide a dolly for carrying a boat in a laterally vertical position with the dolly having a stabilizing bar to hold the boat in this position.

A further object is to provide a dolly for carrying a boat in a laterally vertical position including a means for stabilizing the boat as it is being raised from or lowered to a flat horizontal position and also when the boat is being transported.

Yet another object is to provide a dolly that is adjustable in width to accommodate boats of different depths which are being transported in a laterally vertical position.

Other objects and advantages of the present invention will become more apparent upon reference to the following specification and annexed drawings, in which:

BRIEF DESCRIPTION OF THE DRAWINGS

FIG. 1A is a view of the top part of the stabilizing bar with a fastening cord at its end.

FIG. 6 shows a bag for carrying the dolly.

DETAILED DESCRIPTION OF THE INVENTION

Figure 1:
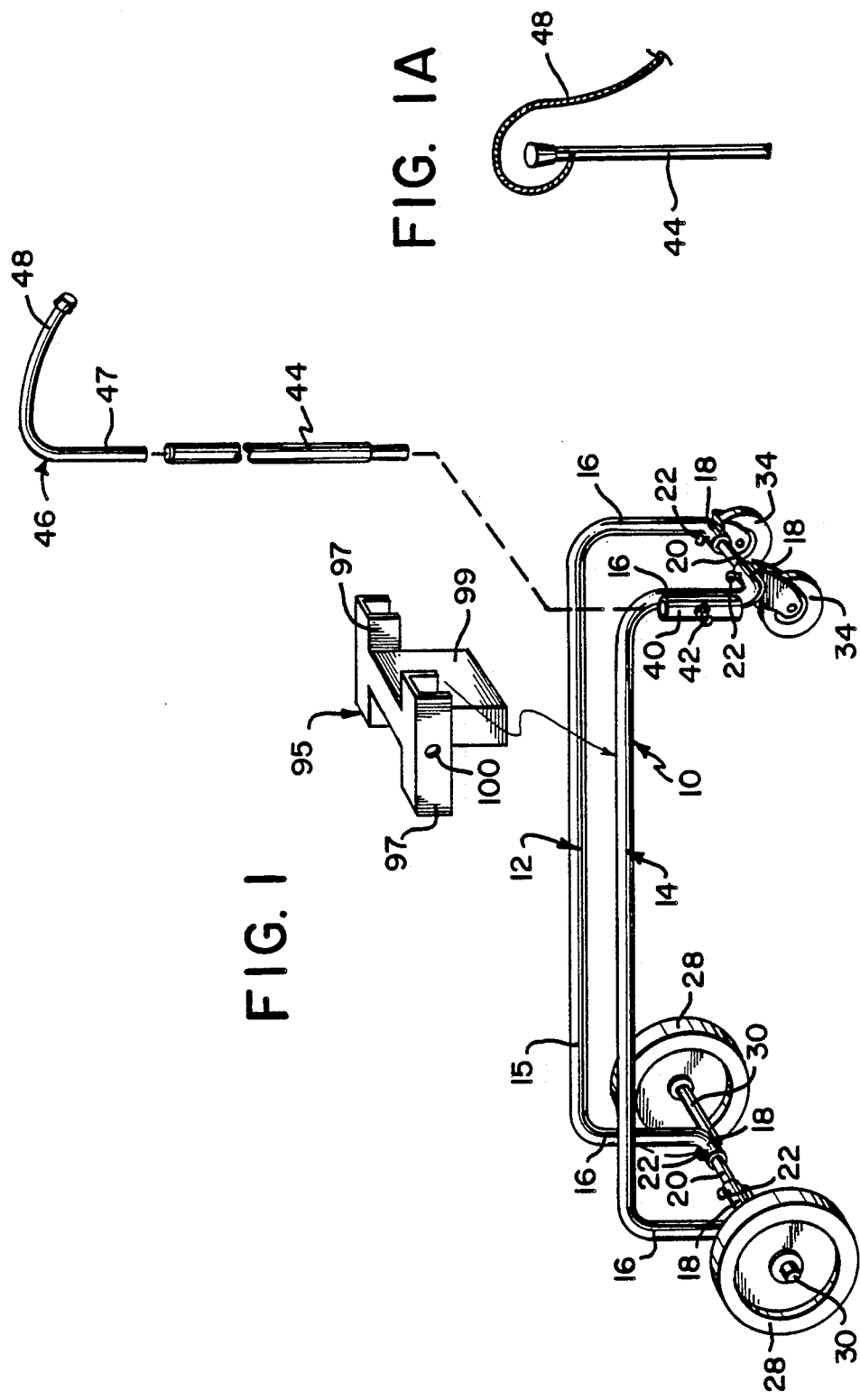
FIG. 1 is a perspective view of the dolly in a fully assembled condition.
Figure 2:
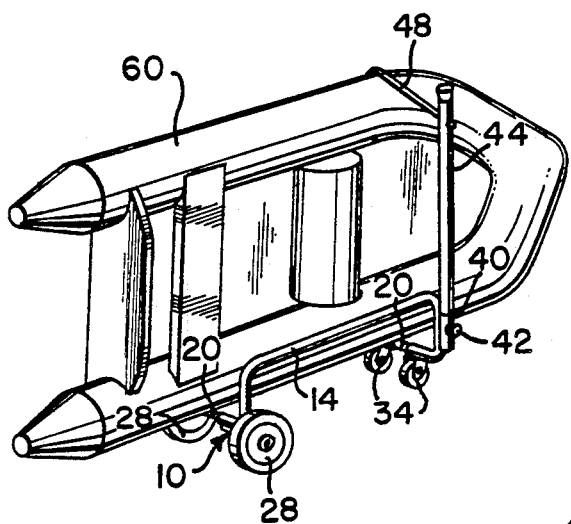
FIG. 2 is a perspective view showing the dolly assembled and in use for transporting a boat.

Referring to the drawings and particularly to FIGS. 1-3, the dolly 10 has a pair of main frame members 12 and 14 which can be of any suitable material, for example, tubular aluminum or steel. If steel is used, it is painted or epoxy coated so it will not rust. Each of the frame members 12 and 14 is generally U-shaped with an elongated center beam 15, and a downwardly extending leg 16 at each end which is substantially at a right angle to the center beam 15. There is an inwardly extending tail piece 18 at the end of each leg 16 extending inwardly. As seen, each tail piece 18 is orthogonal to the center beam 15 of its corresponding frame member.

The two frame members 12, 14 are attached by slipping the ends of the pair of tail pieces 18 of their hollow legs 16 over a connecting rod 20. Each tail piece 18 has a suitable fastener thereon, for example, a thumb screw 22, which is threaded directly into the tail piece 18 to engage the connecting rod. Alternatively, if desired, each connecting rod 20 can be provided with a plurality of spaced, threaded holes to accept the thumb screw. Pressure, or snap-type fasteners also can be used.

When assembled, the two frame pieces 12 and 14 form a pocket or cradle therebetween (see FIG. 1). The width of the pocket can be adjusted by moving the two frame pieces relative to the connecting rods 20 and securing the fasteners 22. The width of the pocket is selected to essentially accommodate the depth of the boat to be carried at its beam. Basically, the dolly is to be placed on the boat's beam end thereby finding the boat beam-wise into the pocket for about 30–40% of the width from its beam toward its center. The pocket does not have to accept the full depth of the boat.

A wheel is mounted to each end of each of the frame pieces 12, 14, with fixed wheels 28 at the back end of the dolly and smaller diameter swivel wheels 34 at the front end. The mounting can be made by any suitable arrangement. For example, at the dolly back end an axle 30 is attached to the bottom of each tail piece 18 and the wheel 28 rotatably attached thereto. The swivel type wheel 34 is mounted to each of the tail pieces 18 at the front end of the frame by a direct attachment, e.g., screws, welding, etc.

A tubular socket 40 is fastened, such as by welding or some other suitable fastening means, to one of the legs 16 of one of the frame pieces at the front end of the dolly. A fastener 42, such as a thumb screw, is provided in the socket wall to accept and hold the bottom end of a stabilizing bar 44. The stabilizing bar is also preferably of tubular material so that a generally L-shaped tie arm 46 can be inserted and held therein. The tie arm has a vertical leg 47 which fits into the tubular vertical stabilizing bar 44 and a curved arm 48 whose function is to overlie and engage the boat beam, as is described later. The height of the tie arm 46 relative to the frame 10 can be adjusted by means of the set screw 42 in the socket 40. In another embodiment, the stabilizer bar may end straight with a fastening cord affixed to its end for tying to the beam end or to pass around the boat and be fastened to another part of the dolly frame. This is shown in FIG. 1A, which shows the top of the stabilizing bar 44 with a cord 48 at its end, which may be of elastic material.

Figure 3A:
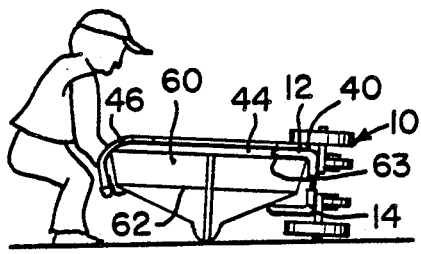
FIGS. 3A and 3B are schematic views showing a person lifting the boat onto the dolly.
Figure 3B:
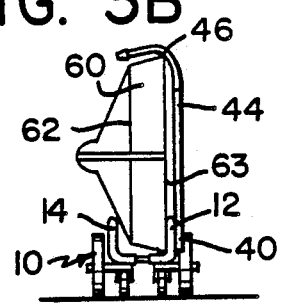

Referring to FIG. 3A, the use of the dolly is explained. A boat 60 is shown resting on the ground or its keel. The dolly 10 is laid on its side and is manuevered until the boat beam 62 fits into the pocket. This is relatively easy to do because the dolly is quite light. The pocket space between the two frame members 12, 14 has been adjusted to be wide enough to accept one beam 62. The user then inserts the stabilizing bar 44 into the socket 40 on the frame piece 14. Thereafter, the tie arm 46 is placed over the other (upper) beam 63 of the boat. The height of the stabilizing bar is adjusted by moving it in the socket 40 so that the tie arm engages the other beam 63, and the stabilizing bar is fixed in position by tightening down on the screw 42. As seen in FIG. 3B, the user can then pick up the boat by its beam 63. That is, the dolly with the boat thereon is rotated by 90°. This can be done by grasping and lifting on the beam end opposite the wheels. The larger diameter wheel which rests on the ground provides fulcrum points when the boat is lifted.

FIG. 2 shows a perspective view of the boat in the dolly 10 ready to be transported while FIG. 3B shows an end view. Since the dolly front wheels 34 are of the swivel type, the dolly can be easily steered. The user merely pushes or pulls the boat in the desired direction.

FIG. 1 shows in exploded form a mounting frame 95 for an outboard motor. The frame has a channel arm 97 mounted on each side of central block 99. Each arm 97 fits over the center strut 15 of a frame member. Each channel arm 97 can be fastened to a strut 15 by a suitable fastener, such as a screw or locking pin (not shown), inserted into a mounting hole 100. The motor (not shown) is fastened by its mounting clamps which are usually C-type screw clamps (also not shown) to the center block 99.

The dolly can be configured to be towed by a vehicle. To do this, a hitching member can be attached to the legs 16 on the frame of the dolly. The hitch can be held by removable fasteners so that it can be detached.

As should be apparent, the dolly has a number of advantages. It totally supports the weight of the boat while the boat is being transported. Since the boat is being transported with its beam in a lateral vertical position, the transport width of the boat is relatively small. Accordingly, it can readily pass between narrow access places such as the railing of an average gangway or a ramp leading to and from the dock or a landing place.

The stabilizing arm 44 acts to stabilize the boat when the dolly and the boat therein is being raised to or lowered from the horizontal position. Also, for ease of storage and carrying, the stabilizing bar stabilizes the boat while it is being rolled or maneuvered on the dolly. This is particularly true in times of high wind. It should be noted that the stabilizing bar can be removed and also its height adjusted so that boats of different beam widths can be accommodated. Similarly, the pocket space between the two frames 12, 14 is also adjustable so that boats of different depth can be accommodated.

Also, the dolly can be easily disassembled into the two frame members, the connecting rods and the stabilizing bar.

Figure 5:
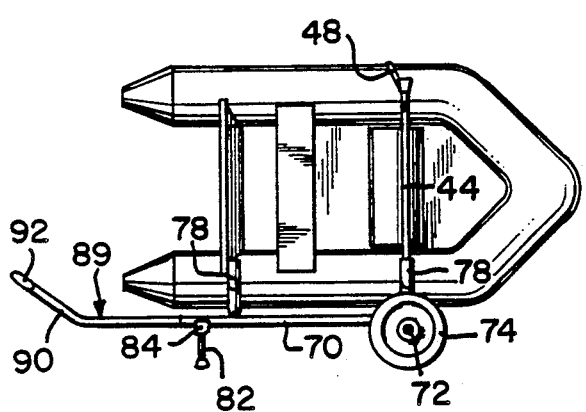
FIG. 5 is an elevational view showing a boat being carried in the dolly of FIG. 4.
Figure 4:
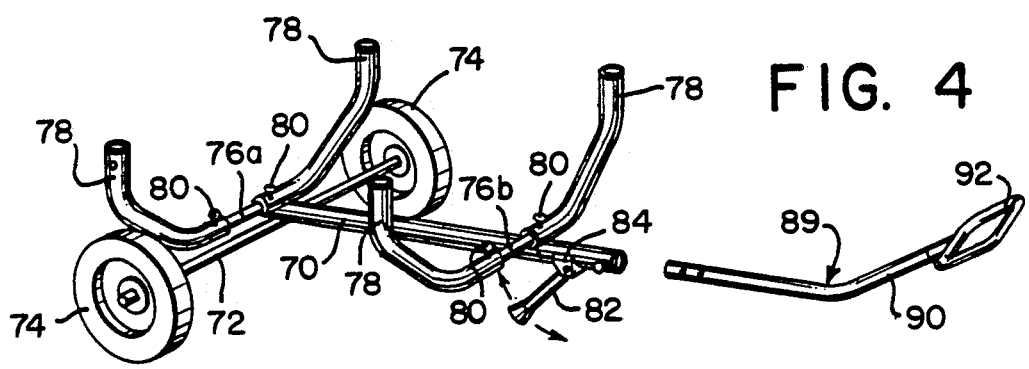
FIG. 4 is a perspective view of a two-wheel version of the dolly.

FIGS. 4 and 5 show a two-wheel version of the dolly. Here, there is a center support strut 70 which has an axle 72 mounted crosswise at one end thereof. A wheel 74 is rotatably mounted to each end of the axle 72.

Mounted transverse to the center strut 70 are a pair of connecting rods 76a–76b. One of the connecting rods 76a is at one end of the strut where the axle is mounted and can be above or on the same level as the axle. The other connecting rod 76b is near, but not at, the other end of the center strut.

A retaining arm 78 is mounted to each end of each cross piece 76. The mounting can be permanent, such as by welding, or by a fastener such as a thumb screw 80. This permits the distance between two retaining arms to be adjusted, as with the embodiment of FIG. 1, again for the purpose of the dolly accepting boats of different depths.

The retaining arms 78 are also preferably of tubular material. One of the arms 78 at the end of the connecting rod 76a, serves as a pocket for the stabilizing bar 44.

A retractable skid 82 is mounted near the end of the center strut 70 remote from axle 72. This preferably is by a snap-action mounting means 84 such that the skid will be either in an up or a down position.

Center strut 70 is also preferably tubular so that it can accept one end of a handle arm 89 whose front part 90 is upwardly curved for ease of grasping. A handle piece 92 can be attached to this end. A portion of the handle arm 89 which is inserted into the center can be held therein, for example, by a suitable fastener. The handle is desirable in the two wheel dolly embodiment, since there are no swivel type wheels. That is, the user must exert more effort by steering the dolly via the handle. However, the user may move and direct the dolly by holding and guiding it from one end of the boat, without using a handle.

I claim:

1. A dolly for raising a boat from a horizontal position and for transporting it in a laterally vertical beam-wise position comprising a pair of elongated U-shaped frame members having a central piece and downwardly turned ends;

a cross-piece having one end fixedly connected to the bottom of each of said frame member downwardly turned ends for coupling the respective ends of the two frame members together and defining a pocket between the elongated frame members with the frame members being spaced and generally parallel to each other to form a pocket, the beam of the boat adapted to be moved into the pocket between the frame members when the dolly is on its side and to rest on said cross-pieces when the dolly is upright, and at least one wheel attached to each cross-piece to raise the cross-pieces above the ground when the dolly is erect and so that the dolly with the boat therein can be moved, one of the cross-pieces having a first wheel at each end thereof whose central axis is proximate the cross-piece on which the boat beam rests when the dolly is erected and the central piece of each frame member being proximate and above the height of said first wheels.

2. A boat dolly as in claim 1 wherein said cross-pieces for coupling the ends of the frame members comprise adjustable coupling means permitting the width of the pocket between the frame members to be adjusted to accommodate boats of different depths.

3. A boat dolly as in claim 1 wherein the wheels on one of the cross-pieces rotate about an axis and the at least one wheel on the other cross-piece swivels.

4. A boat dolly as in claim 1 further comprising a vertical stabilizing bar having one end mounted to one of said frame members and an elastic member on the other end of said bar for securing the boat in the dolly.

5. A boat dolly as in claim 1 further comprising a stabilizing bar attached to a frame member, one end of said stabilizing bar adapted to engage and hold the beam of the boat located above the frame member.

6. A boat dolly as in claim 5 further comprising means for removably attaching said stabilizing bar.

7. A boat dolly as in claim 6 wherein said stabilizing bar comprises two parts, a first part having one end adapted for attachment to a said frame member and a second part extending generally transverse to said first part to overlie the beam of the boat, said beam being located above the frame member.

8. A boat dolly as in claim 7 further comprising means for removably attaching the second part of the stabilizing bar to the first part.

9. A boat dolly as in claim 5 further comprising a block on which an outboard motor is to be mounted, and means for mounting said block on said frame member.

10. A boat dolly as in claim 5, further comprising a carrying bag shaped and having integral loops to be attached to a frame member for carrying the parts of the dolly.

* * * * *